3,253,013
ESTERS OF METABORIC ACID AND PROCESS FOR THE PREPARATION THEREOF

Lodovico Avogadro Di Cerrione, Turin, and Carlo Ferraris, Avigliana, Italy, assignors to Montecatini Società Generale per l'Industria Mineraria e Chimica, Milan, Italy, a corporation of Italy
No Drawing. Filed June 11, 1962, Ser. No. 201,335
Claims priority, application Italy, June 14, 1961, 11,014/61
3 Claims. (Cl. 260—462)

Our invention relates to a process for the preparation of esters of metaboric acid. These esters are generally considered as derivatives of the trimer of the metaboric acid having the formula $R_3B_3O_6$. The esters may also be considered as derivatives of boroxine, whose hexatomic ring they probably contain in the molecule, or as esters of boric acid which contain a mole of boric anhydride per mole of ester.

Esters of metaboric acid with organic radicals of differing nature, mono- or polyvalent, e.g. esters with aliphatic, aromatic, alicyclic alcohols, and esters with di- or polyvalent glycols which may or may not contain a nitrogen atom, etc., are known. It is also known that simple esters may exist, i.e. containing only one type of organic radical in the molecule, and mixed esters may exist, i.e. containing two or three types of organic radicals in the same molecule.

These products are of great interest because of their many practical applications, for instance antifire substances in the burning of light metals (magnesium, titanium, zirconium), as dehydrating agents, intermediates in the synthesis of the other compounds containing boron, and particularly as fuel additives.

The processes utilized for the preparation of these compounds are based either on an addition reaction of boric anhydride to an ester of boric acid or on an esterification reaction of metaboric acid with the corresponding alcohol.

Our invention has as an object a new process for the preparation of a wide range of metaboric acid esters, using as raw materials only boric acid and its esters with alcohols and polyalcohols.

We have found that by reacting boric acid with one or more of its esters, it is possible to prepare any simple or mixed ester of metaboric acid.

The reaction, however, does not proceed with all the esters in the same way, but has a different course depending on the esters used.

In the preparation of simple esters of metaboric acid, the reactions which occur are essentially the following:

(1)   $H_3BO_3 + 2(RO)_3B \rightarrow (RO)_3B_3O_3 + 3ROH$
(2)   $2H_3BO_3 + (RO)_3B \rightarrow (RO)_3B_3O_3 + 3H_2O$ Only Reaction 1 occurs when R is $CH_3$. When R is an alkyl radical having 2–4 carbon atoms, both Reactions 1 and 2 occur simultaneously. When R is an alkyl radical having 5 or more carbon atoms or is a residue of a glycol or of a trihydric alcohol, only Reaction 2 occurs.

In other words, we have found that regardless of the ratio according to which boric acid and the boric acid ester are admixed, the amounts of the two reactants which participate in the reaction are fixed by the above stated equations, while the excess of the reactants remains unchanged.

It is therefore advisable, depending on the particular metaboric acid ester to be prepared, to mix boric acid and its ester in the ratio defined by the Reactions 1 and 2.

For the preparation of the methyl metabate according to the Equation 1, however, it is advisable to work in the presence of an excess of trimethyl borate, so as to easily remove the methyl alcohol from the system as a trimethyl borate-methanol azeotrope.

On the other hand, the preparation of metaboric acid esters, in which R has two or more carbon atoms, is suitably carried out in the presence of a solvent, such as benzene, toluene, etc., which forms an azeotrope with the reaction water. More particularly, in the case of boric acid esters in which R has five or more carbon atoms or is a residue of a polyhydric alcohol, since only Reaction 2 occurs, the azeotrope, water-solvent, will distill, while when R is an alkyl radical having 2–4 carbon atoms, since the Reactions 1 and 2 occur at the same time, the azeotrope, water-alcohol-solvent, will distill. In this last case, it must be borne in mind, that the quantities of the reactants to be used are determined not only from the sum of the Reactions 1 and 2, but from the sum of multiples and submultiples of these reactions in dependence upon the moles of water and alcohol contained in the considered azeotrope.

For instance, when tri-n-butoxyboroxine is prepared from boric acid and tri-n-butylborate, if we work in the absence of solvent, an azeotrope water-n-butanol will distill in which water and alcohol are present in a molar ratio of about 3:1. The total reaction is obtained, therefore, by adding the Reaction 1 to the Reaction 2 multiplied for a coefficient 3 so that on the right-hand side of the reaction, the ratio water:alcohol will be equal to 3:1:

$$7H_3BO_3 + 5(n\text{-}C_4H_9O)_3B \rightarrow 4(n\text{-}C_4H_9O)_3B_3O_3 + 3n\text{-}C_4H_9OH + 9H_2O$$

For the preparation of mixed esters of the metaboric acid according to our invention, we have found that the reaction occurs according to the following equations:

(3)   $3H_3BO_3 + 4B(OR)_3 + 2B(OR')_3 \rightarrow$
       $3(RO)(R'O)_2B_3O_3 + 9ROH$
(4)   $3H_3BO_3 + 5B(OR)_3 + B(OR')_3 \rightarrow$
       $3(RO)_2(R'O)B_3O_3 + 9ROH$
(3')  $6H_3BO_3 + B(OR)_3 + 2B(OR')_3 \rightarrow$
       $3(RO)(R'O)_2B_3O_3 + 9H_2O$
(4')  $6H_3BO_3 + 2B(OR)_3 + B(OR')_3 \rightarrow$
       $3(RO)_2(R'O)B_3O_3 + 9H_2O$ wherein R is an alkyl radical having 1–4 carbon atoms, while R', always higher than R, may be any alkyl radical or a residue of a polyhydric alcohol or an aromatic radical.

More particularly, we have found that the Reactions 3 and 4 occur when $B(OR)_3$ is the trimethyl ester of the boric acid, whereas when $B(OR)_3$ is the ethyl, propyl or butyl ester, the Reactions 3–3' or 4–4' occur simultaneously.

As above stated, in the case of simple esters, it is useless to employ an excess of reactants with respect to the above-mentioned reactions, since the compound in excess remains unchanged in the final mixture.

However, when $B(OR)_3$ is the trimethyl ester of the boric acid it is advisable to work with an excess of said ester in order to remove easily the methyl alcohol of the mixture as azeotrope $(CH_3O)_3B/CH_3OH$.

On the contrary, in all the remaining cases, it is possible to work either without solvents, by distilling off the binary azeotrope water-alcohol, or in the presence of a solvent so as to distill off the ternary azeotrope water-solvent-alcohol. In this case it is to be noted that the quantities of the reactants to be used are determined not only from the sum of the Equations 3 and 3' or 4 and 4', but also from the sum of multiples and submultiples of said reactions, so that in the right-hand side of the total equation, water and alcohol are in the molar ratios of the azeotrope.

In the following Table I the molar ratios and the boiling points of the azeotropes of water-aliphatic alcohols having 2–4 carbon atoms and the corresponding values of some ternary azeotropes of water-alcohol-benzene are listed.

TABLE I

|  | M.R., water/alcohol | B.P., °C. |
|---|---|---|
| Water-ethanol | 1/10 | 78.2 |
| Water-n-propanol | 4/3 | 87 |
| Water-i-propanol | 1/2 | 80.3 |
| Water-n-butanol | 3/1 | 92.7 |
| Water-i-butanol | 2/1 | 89.8 |
| Water-s-butanol | 3/2 | 87.5 |
| Water-t-butanol | 5/9 | 79.9 |
| Water-ethanol-benzene | 1/1 | 64.9 |
| Water-n-propanol-benzene | 5/2 | 67 |
| Water-t-butanol-benzene | 4/3 | 66.5 |
| Water-t-butanol.benzene | 3/2 | 67.3 |

The following examples are to illustrate, but not to limit, the present invention:

*Example 1.—Trimethoxyboroxine*

$$H_3BO_3 + 5(CH_3O)_3B \rightarrow (CH_3O)_3B_3O_3 + 3CH_3O)_3B + CH_3OH$$

61.84 g. of boric acid were introduced into a flask containing 624 g. of trimethyl borate. The mixture was distilled off by means of an efficient packed distillation column provided with a reflux chamber. The azeotrope borate-methanol is distilled off at 54.6° C. and then the major portion of the excess trimethyl borate is distilled off at 68.7° C. The residue was kept under vacuum (residual pressure 15 mm.) at room temperature for 12 hours, thus obtaining 172 g. trimethoxyboroxine as a final residue.

B% found=18.8; B% theoretical=18.76.

*Example 2.—Tri-n-propoxyboroxine*

$$12H_3BO_3 + 9(n\text{-}C_3H_7O)_3B \rightarrow 7(n\text{-}C_3H_7O)_3B_3O_3 + 6n\text{-}C_3H_7OH + 15H_2O$$

37 g. of boric acid were introduced into a flask together with 85 g. of tri-n-propylborate and 600 g. of benzene. The mixture was heated and then distilled through an efficient fractionating column provided with reflux chamber. First the ternary azeotrope, n-propanol-water-benzene having a boiling point of 67° C., was collected and then the excess of the used benzene. The last traces of benzene were removed under vacuum (residual pressure 15 mm.) at about 40° C. 90.5 g. tri-n-propoxyboroxine were obtained as a residue.

B% found=12.48; B% theoretical=12.55.

*Example 3.—Tri-n-butoxyboroxine*

$$7H_3BO_3 + 5(n\text{-}C_4H_9O)_3B \rightarrow 4(n\text{-}C_4H_9O)_3B_3O_3 + 3n\text{-}C_4H_9OH + 9H_2O$$

48 g. boric acid were introduced into a flask together with 128 g. tri-n-butyl borate. The mixture was distilled through an efficient fractionating column. The azeotrope n-butanol-water distilled off at 92.7° C. The last traces of azeotrope were removed under vacuum (residual pressure 15 mm.) at about 80° C. 134 g. tri-n-butoxyboroxine were obtained as a residue.

B% found=10.67; B% theoretical=10.82.

*Example 4.—Tri-cyclohexoxyboroxine*

$$2H_3BO_3 + (C_6H_{12}O)_3B \rightarrow (C_6H_{12}O)_3B_3O_3 + 3H_2O$$

41.3 g. boric acid were introduced in a flask together with 102.4 g. of powdered tri-cyclohexyl borate and 300 g. benzene. The mixture was heated under reflux through an efficient fractionating column having a distillation head provided with a decantation cup for the aqueous layer. After boiling 24 hours under reflux, 18 g. water had been separated. The benzene was then distilled off and the residue was heated under vacuum (residual pressure 15 mm.) at about 100° C. in order to remove the last traces of solvent. 125 g. of white, solid tri-cyclohexoxyboroxine having a melting point of 165° C. were obtained.

B% found=8.33; B% theoretical=8.58.

*Example 5.—1-methyl-trimethylenmetaborate*

$$4H_3BO_3 + \begin{matrix} CH_2-O \\ | \\ CH_2 \\ | \\ CH-O \\ | \\ CH_3 \end{matrix} \begin{matrix} \diagdown \\ B-O-CH_2CH_2CH-O-B \\ \diagup \end{matrix} \begin{matrix} O-CH_2 \\ | \\ CH_3 \end{matrix} \begin{matrix} \diagdown \\ CH_2 \\ \diagup \\ O-CH_2 \\ | \\ CH_3 \end{matrix} \longrightarrow$$

$$\begin{matrix} CH_2-O \\ | \\ CH_2 \\ | \\ CH-O \\ | \\ CH_3 \end{matrix} \begin{matrix} \diagdown \\ (B_3O_3)-O-CH_2CH_2CH-O-(B_3O_3) \\ \diagup \\ CH_3 \end{matrix} \begin{matrix} O-CH_2 \\ | \\ CH_3 \end{matrix} \begin{matrix} \diagdown \\ CH_2 \\ \diagup \\ O-CH \\ | \\ CH_3 \end{matrix} + 6H_2O$$

82 g. boric acid were introduced in a flask together with 95.5 g. tris-(1,3-butendiole)diborate and 200 g. benzene. The mixture was heated under reflux through an efficient fractionating column having a distillation head provided with a cup for the decantation of the aqueous layer. After boiling 24 hours under reflux, 36 g. water had been separated. The benzene was then distilled off and the residue was heated under vacuum (residual pressure 15 mm.) at about 100° C. in order to remove the last traces of the solvent. 142.3 g. 1-methyl-trimethylenmetaborate, in form of a dense caramel having a slightly dark color, were obtained.

B% found=15.05; B% theoretical=15.30.

*Example 6.—Nitrilotriethylenmetaborate*

$$2H_3BO_3 + N\begin{matrix} CH_2CH_2O \\ -CH_2CH_2O- \\ CH_2CH_2O \end{matrix}B \rightarrow N\begin{matrix} CH_2CH_2O \\ -CH_2CH_2O-(B_3O_3) \\ CH_2CH_2O \end{matrix} + 3H_2O$$

124 g. boric acid have been introduced in a flask, provided with stirrer, containing 157 g. powdered tri-ethanolaminoborate and 500 g. toluene. The mixture was heated under reflux through an efficient fractionating column provided with distillation chamber and cup for the decantation of the aqueous layer. After boiling for 5 days under reflux about 54 g. water were separated. The toluene was then distilled off and the residue was heated under vacuum at about 100° C. (residual pressure 15 mm.) in order to remove the last traces of the solvent. The residue consisted of 225 g. nitrilotriethylenmetaborate, in form of a light yellow solid which melts with decomposition at about 200° C.

N% found=6.01; N% theoretical=6.17.

*Example 7.—Triethoxyboroxine*

$$H_3BO_3 + 4B(OCH_3)_3 + B(OC_2H_5)_3 \rightarrow (C_2H_5O)_3B_3O_3 + 3(CH_3O)_3B\cdot CH_3OH$$

31 g. boric acid were introduced into a flask together with 228 g. trimethyl borate and 73 g. triethyl borate. The mixture was distilled through an efficient fractionating column provided with a reflux chamber. First the azeotrope trimethyl borate-methanol was collected at 54.6° C., and then the excess of the trimethyl borate used was collected at 68.7° C. The residue consisted of 106 g. triethoxyboroxine.

B% found=15.2; B% theoretical=15.03.

*Example 8.—Tri-n-butoxyboroxine*

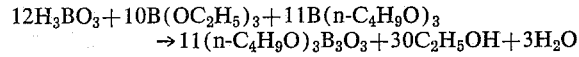
→11(n-C$_4$H$_9$O)$_3$B$_3$O$_3$+30C$_2$H$_5$OH+3H$_2$O 37 g. boric acid were introduced in a flask in the presence of 73 g. triethyl borate and of 126.7 g. tri-n-butyl borate. The mixture was distilled by means of an efficient packed column provided with a reflux chamber. The azeotrope ethanol-water was collected at 78.2° C. The residue consisted of 166 g. tri-n-butoxyboroxine.

B% found=10.62; B% theoretical=10.82.

*Example 9.—Tri-i-amyloxyboroxine*

H$_3$BO$_3$+4B(OCH$_3$)$_3$+B(i-C$_5$H$_{11}$O)$_3$
→(i-C$_5$H$_{11}$O)$_3$B$_3$O$_3$+3(CH$_3$O)$_3$B.CH$_3$OH 31 g. boric acid were introduced into a flask in the presence of 258 g. trimethyl borate and of 136 g. tri-i-amyl borate. The mixture was distilled through an efficient fractionating column provided with a reflux chamber. The azeotrope borate-methanol was collected at 54.6° C. The excess of the trimethyl borate which has been used was collected at 68.7° C. The residue consisted of 171.3 g. tri-i-amyloxyboroxine.

B% found=9.55; B% theoretical=9.50.

*Example 10.—Tri-i-amyloxyboroxine*

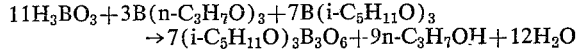
→7(i-C$_5$H$_{11}$O)$_3$B$_3$O$_6$+9n-C$_3$H$_7$OH+12H$_2$O 75.5 g. boric acid were introduced into a flask in the presence of 62.7 g. tri-n-propylborate and of 211 g. tri-i-amylborate. The mixture was distilled through an efficient fractionating column provided with a reflux chamber. The azeotrope n-propanol-water was collected at 87° C. The residue consisted of 264 g. tri-i-amyloxyboroxine.

B% found=9.12; B% theoretical=9.50.

*Example 11.—Tri-i-amyloxyboroxine*

11H$_3$BO$_3$+3B(i-C$_3$H$_7$O)$_3$+7B(i-C$_5$H$_{11}$O)$_3$
→7(i-C$_5$H$_{11}$O)$_3$B$_3$O$_3$+9i-C$_3$H$_7$OH+12H$_2$O 62 g. boric acid were introduced into a flask containing 51.5 g. tri-i-propylborate, 173 g. tri-i-amyl borate and 500 g. benzene. The mixture was distilled through an efficient fractionating column and the ternary azeotrope, i-propanol-water-benzene, was collected at 66.5° C. The excess benzene was distilled off and the last traces of the solvent were removed under vacuum (residual pressure 15 mm.; temperature 60° C.). The residue consisted of 222 g. tri-i-amyloxyboroxine.

B% found=9.12; B% theoretical=9.50.

*Example 12.—(n-propyl)(di-i-amyl)metaborate*

11H$_3$BO$_3$+5.33B(n-C$_3$H$_7$O)$_3$+4.66B(i-C$_5$H$_{11}$O)$_3$
→7(n-C$_3$H$_7$O)(i-C$_5$H$_9$O)$_2$B$_3$O$_3$+9n-C$_3$H$_7$OH+12H$_2$O 34 g. boric acid were introduced into a flask in the presence of 50.2 g. tri-n-propylborate and of 63.3 g. tri-i-amylborate. The mixture was distilled through an efficient fractionating column provided with reflux chamber and the azeotrope, n-propanol-water, was collected at 87° C. The residue consisted of 106 g. (n-propyl)(di-i-amyl) metaborate.

B% found=10.72; B% theoretical=10.32.

*Example 13.—(n-octyl)(di-i-butyl)metaborate*

15H$_3$BO$_3$+9B(i-C$_4$H$_9$O)$_3$+3B(n-C$_8$H$_{17}$O)$_3$
→9(i-C$_4$H$_9$O)$_2$(n-C$_8$H$_{17}$O)B$_3$O$_3$+9i-C$_4$H$_9$OH+18H$_2$O 46.2 g. boric acid were introduced into a flask in the presence of 103.5 g. tri-i-butylborate and of 59.6 g. tri-n-octylborate. The mixture was distilled through an efficient fractionating column provided with reflux chamber and the azeotrope, i-butanol-water, was collected at 90° C. The residue consisted of 161.4 g. (n-octyl)(di-i-butyl) metaborate.

B% found=8.97; B% theoretical=9.12.

*Example 14.—(Methyl)(1-methyltrimethylen) metaborate*

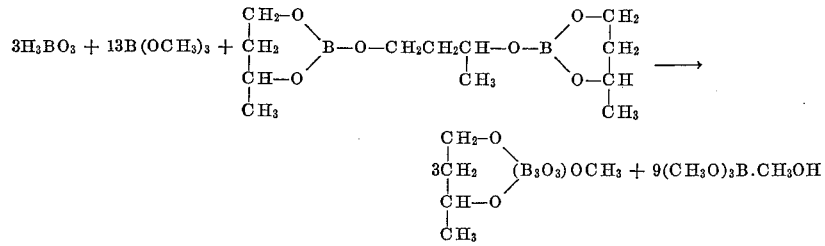

31 g. boric acid were introduced into a flask together with 275 g. trimethylborate and 47.6 g. tris(1,3-butandiole)diborate. The mixture was distilled through an efficient fractionating column provided with reflux chamber and the azeotrope, borate-methanol, was collected at 54.6° C. The excess trimethylborate was collected at 68.7° C. The last traces of trimethylborate were removed under vacuum (residual pressure 15 mm.; temperature 60° C.). The residue consisted of 99 g. (methyl)(1-methyltrimethylen)metaborate.

B% found=16.4; B% theoretical=16.25.

*Example 15.—(Ethyl)(2,2-dimethyltrimethylen) metaborate*

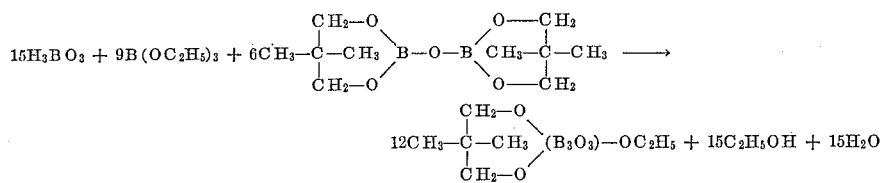

46.5 g. boric acid were introduced into a flask containing 66 g. tri-ethylborate, 72.6 g. tris(2,2-dimethylpropandiole 1,3)diborate and 700 g. benzene. The mixture was distilled through an efficient fractionating column provided with reflux chamber and the ternary azeotrope, water-ethanol-benzene, was collected at 65° C. The excess benzene was then distilled off and the last traces of the solvent were removed under vacuum (residual pressure 15 mm.; temperature 35° C.). The residue consisted of 134.2 g. of (ethyl)(2,2-dimethyltrimethylen)metaborate.

B% found=14.03; B% theoretical=14.22.

We claim:

1. A process for the preparation of mixed metaboric acid esters which comprises reacting boric acid with two different boric acid esters, one of which contains alkyl radicals having not more than 4 carbon atoms while the other boric acid ester contains an alkyl radical having up to 8 carbon atoms and a molecular weight higher than that of the first ester at the reflux temperature of the reactant mixture.

2. (n-Propyl)(di-i-amyl)metaborate.
3. (n-Octyl)(di-i-butyl)metaborate.

References Cited by the Examiner

UNITED STATES PATENTS

| | | | |
|---|---|---|---|
| 2,642,463 | 6/1953 | Lippincott | 260—462 |
| 2,839,565 | 6/1958 | May | 260—462 |
| 2,866,811 | 12/1958 | Irish et al. | 260—462 |
| 2,891,086 | 6/1959 | Schechter | 260—462 |
| 2,927,124 | 3/1960 | Olmsted et al. | 260—462 |
| 3,023,248 | 2/1962 | Ashby | 260—462 X |
| 3,060,219 | 10/1962 | Uchida et al. | 260—462 |

FOREIGN PATENTS 815,140   6/1959   Great Britain.

CHARLES B. PARKER, *Primary Examiner.*

REYNOLD J. FINNEGAN, DELBERT R. PHILLIPS, *Assistant Examiners.*